US008851514B2

(12) United States Patent
Renaudin et al.

(10) Patent No.: US 8,851,514 B2
(45) Date of Patent: Oct. 7, 2014

(54) CHILDCARE DEVICE INCLUDING INFLATABLE SAFETY ELEMENTS

(75) Inventors: Francois Renaudin, Cholet (FR); Nicolas Garnier, Saint Germain sur Moine (FR)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 13/995,651

(22) PCT Filed: Dec. 20, 2011

(86) PCT No.: PCT/EP2011/073450
§ 371 (c)(1),
(2), (4) Date: Sep. 9, 2013

(87) PCT Pub. No.: WO2012/084983
PCT Pub. Date: Jun. 28, 2012

(65) Prior Publication Data
US 2014/0008959 A1    Jan. 9, 2014

(30) Foreign Application Priority Data

Dec. 20, 2010   (FR) ..................................... 10 60856
Feb. 24, 2011   (FR) ..................................... 11 51522

(51) Int. Cl.
    *B60R 21/18* (2006.01)
(52) U.S. Cl.
    USPC ....................................................... 280/733
(58) Field of Classification Search
    CPC ........ B60R 22/10; B60R 22/26; B60R 21/18; B60R 21/2072
    USPC ................................... 280/733; 297/471, 473
    See application file for complete search history.

(56) References Cited

U.S. PATENT DOCUMENTS

| 4,342,483 A | * | 8/1982 | Takada ........................... 297/488 |
| 5,368,328 A | * | 11/1994 | Kamiyama et al. ........... 280/733 |
| 5,413,377 A | * | 5/1995 | Kamiyama et al. ........... 280/733 |
| 7,997,658 B2 | * | 8/2011 | DeLellis et al. ............... 297/484 |
| 8,517,418 B2 | * | 8/2013 | Schondorf et al. ............ 280/733 |
| 8,690,188 B2 | * | 4/2014 | Fiore ............................. 280/733 |

FOREIGN PATENT DOCUMENTS

| DE | 4418028 A1 | 11/1995 |
| EP | 1031472 A2 | 8/2000 |
| GB | 2260780 A | 4/1993 |
| JP | 2004026156 A | 1/2004 |

OTHER PUBLICATIONS

The International Search Report issued in connection with PCT/EP2011/073450 and completed by the ISA/EP on Feb. 21, 2012.
International Preliminary Report on Patentability prepared for PCT/EP2012/000496 and issued on Oct. 29, 2013.
English translation of the International Preliminary Report on Patentability issued in connection with PCT/EP2011/073450.

* cited by examiner

*Primary Examiner* — Faye M. Fleming
(74) *Attorney, Agent, or Firm* — Barnes & Thornburg LLP

(57) ABSTRACT

A child care device is configured to receive a child. The device includes a child-restraint harness including first and second shoulder straps and inflatable elements associated with each shoulder strap.

26 Claims, 3 Drawing Sheets

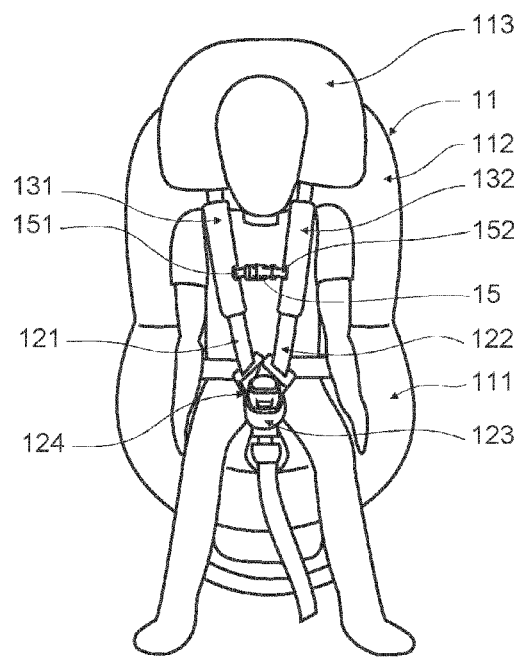
Fig.1
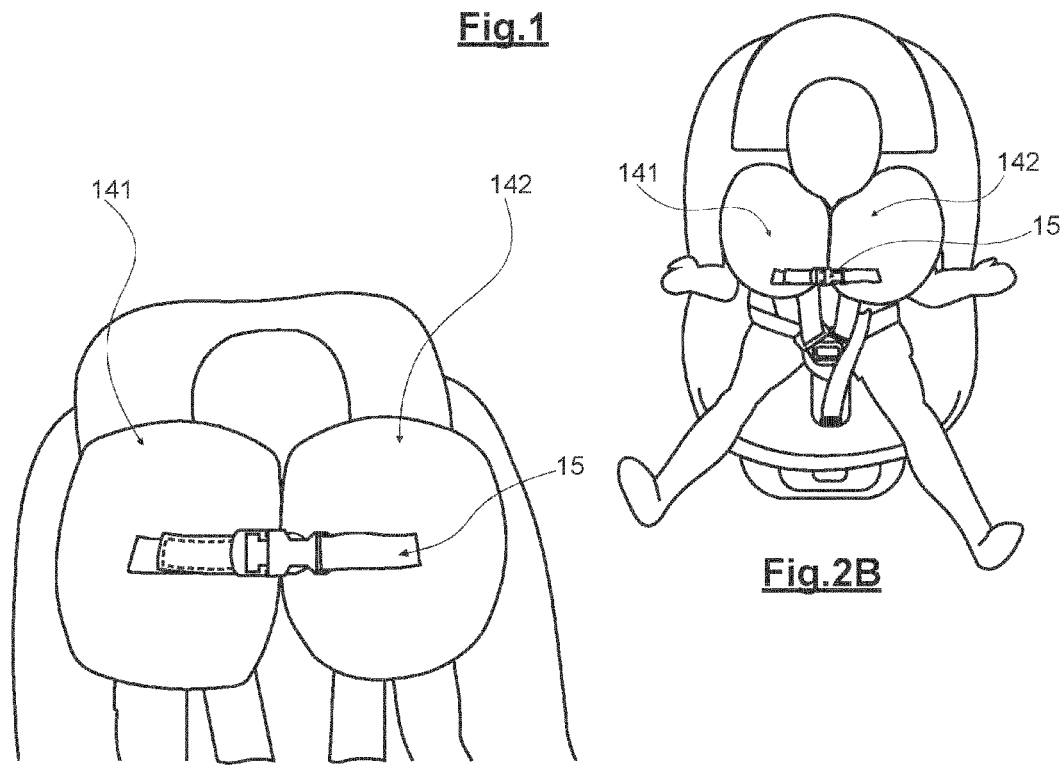
Fig.2A
Fig.2B

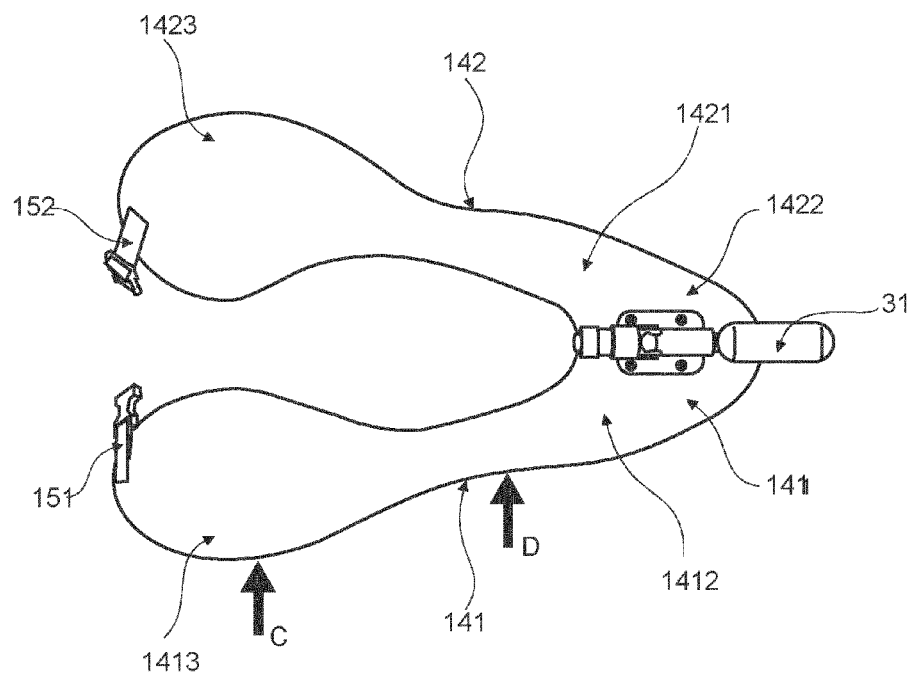
Fig. 3
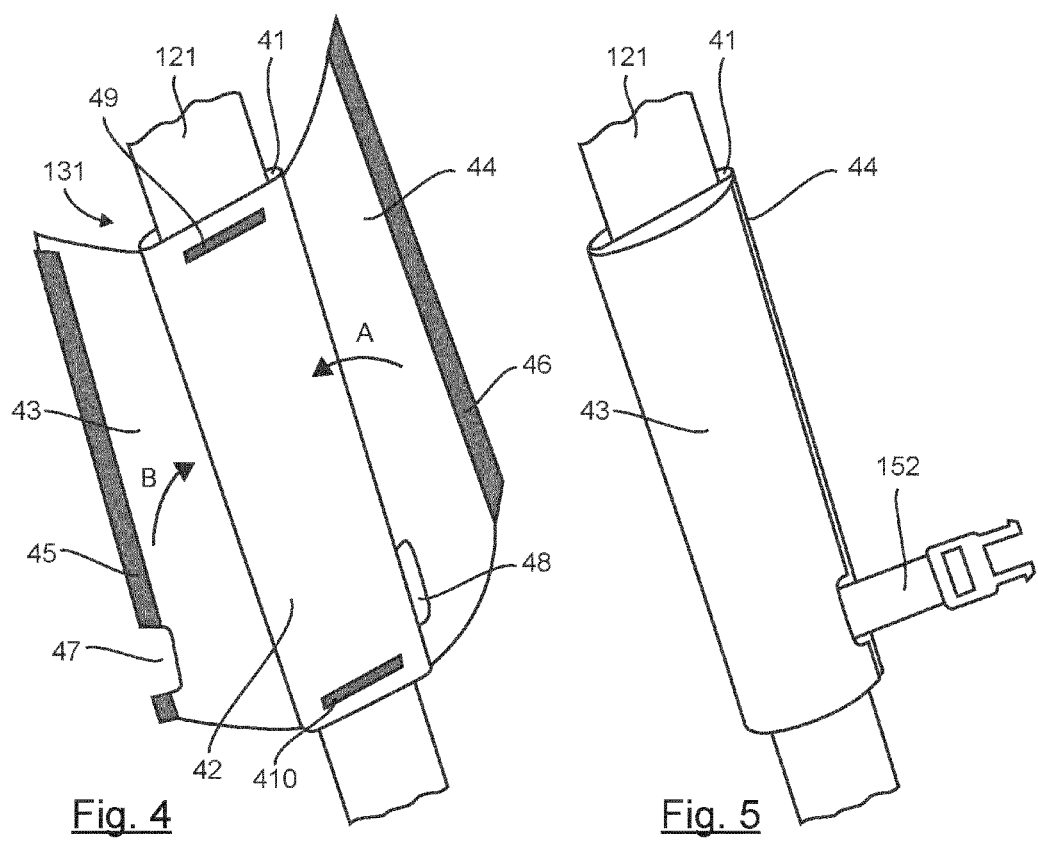
Fig. 4                    Fig. 5

CHILDCARE DEVICE INCLUDING INFLATABLE SAFETY ELEMENTS

CROSS REFERENCE TO RELATED APPLICATIONS

This application is a U.S. nationalization under 35 U.S.C. §371 of International Application No. PCT/EP2011/073450, filed Dec. 20, 2011, which claims priority to French Application No. 1060856, filed Dec. 20, 2010, and French Application No. 1151522, filed Feb. 24, 2011.

The field of the invention is that of child care, and more specifically of devices suitable for receiving a child, particularly in the sitting position. The invention particularly relates to car seats, intended to be attached to a motor vehicle seat or bench seat. It may also be used in devices such as pushchairs, carry cots, bicycle seats, etc.

More specifically, the invention relates to the use of inflatable safety bags, or balloons, or elements, commonly referred to as airbags, the inflation whereof is activated automatically in the event of an impact, to protect the child positioned in the child care device.

The use of airbags is well known, particularly in the motor vehicle sector. More recently, numerous other applications have been envisaged, particularly for children's car seats. However, in the latter case, the solutions envisaged are not completely satisfactory.

It was first envisaged to provide a frontal bag, deploying facing the child (similar to the airbag fitted in a steering wheel, in a vehicle). One drawback of this approach is that this bag needs to be housed in the seat section of the seat, or in a protuberant portion, for example a shield, to the front of said seat section. The bag therefore needs to be large in size and the inflation time thereof is significant, meaning that, in the event of an impact, the child's head is nonetheless moved over an excessive distance.

A further proposed approach consists of providing a plurality of inflatable elements, distributed into a plurality of areas of the seat, as illustrated for example in the document DE4418028. In particular, providing airbags on each of the harness straps has been envisaged. Unfortunately, this technique is ineffective in practice since, in the event of impact, the child's head, which is projected forwards, passes between the two bags, separating them from each other.

Similar problems are encountered in other child care devices.

The aim of the invention is particularly that of remedying at least some of these drawbacks.

More specifically, one aim of the invention is that of providing a child care device enhancing the child's safety in the event of an impact, simply and effectively.

In particular, one aim of the invention is that of providing such a child care device preventing the child's body, and particularly head, being moved over a large distance, in the event of impact.

A further aim of the invention, at least according to some embodiments, is that of providing such a child care device, accounting, for the deployment of the airbag(s), for the size of the child being transported.

These aims, along with others that will emerge hereinafter, are achieved using a child care device suitable for receiving a child, comprising a harness having two straps designed for extending from the shoulders along a child's chest, and each equipped with an inflatable safety element, suitable for being inflated in the event of impact over a predetermined threshold.

According to the invention, the child care device comprises means for reversibly attaching said inflatable safety elements together.

These attachment means are designed so as to hold said safety elements against each other, when inflated. This approach makes it possible to enhance safety simply and effectively. Indeed, in the event of impact, the child's head is generally projected forwards. In this case, the head tends to slip through the two deployed inflatable elements (or airbags), separating said elements. Movement of the child's body, and particularly the head, would thus not be prevented and the effectiveness thereof is significantly reduced.

The presence of these attachment means makes it possible to hold the two inflatable elements in the sought position, preventing said elements from being separated from each other.

This approach was not obvious for those skilled in the art. Indeed, there is nothing to suggest interconnecting two airbags, while generally seeking not to impair the deployment thereof. Moreover, according to the invention, this attachment is not permanent (which would prevent the use of the harness, and in particular positioning the child). Reversible fastening means, which are attached when the child is positioned in the seat and detached when positioning or removing the child, are thus envisaged.

Moreover, joining the airbags to the straps makes it possible to limit the movements of the child's body, and particularly the head, the airbag(s) being as close as possible thereto. Furthermore, the bag deployment time is thus limited and the size thereof may be reduced.

Moreover, the implementation of these inflatable elements associated with the straps is simple to implement and use.

The attachment means may for example comprise at least two flexible portions having at the free ends thereof additional coupling means, so as to extend transversally between the straps, when they are attached, and preferably also hold the straps together.

In other words, they further carry out a function, known per se, of connecting the two straps (referred to as a "chest clip" function), in order to prevent the child from slipping his/her arms under the straps. An advantage of this approach is that the user is incited to use this connection, of which at least the "chest clip" function is directly visible. In this way, with a single connection, two operations are carried out, particularly those of attaching both inflatable elements.

The connection may be provided directly between these inflatable elements, or via elements (straps, sleeves, etc.) to which they are attached.

If said straps each have a sleeve that is slidable along the strap, it may be envisaged for said inflatable safety elements to be housed in the sleeves.

This approach offers the advantage of ensuring that the inflatable elements are always correctly positioned, regardless of the child's size. Indeed, the sleeves are moved, according to the child's size, so as to be always positioned at least partly on the shoulders.

According to one particular embodiment, said sleeves have at least one movable flap, suitable for forming a housing for one of said inflatable safety elements.

Each of said inflatable safety elements may particularly be attached to one of said sleeves via two connections, in the vicinity of each of the ends of said sleeve, respectively.

This enables enhanced control of the deployment of the inflatable elements.

In particular, said inflatable safety elements may be attached to said sleeves by stitching. Further suitable attachment means may obviously be envisaged.

According to one particular embodiment, each of said sleeves has a side opening for inserting said attachment means.

According to a further aspect of some embodiments, said inflatable safety elements are configured so as to define, when inflated, lateral protection on the child's neck and the equivalent of a central bag at the child's head, by the end portions thereof connected together by attachment means.

Said inflatable safety elements may be supplied with at least one source of fluid, for example housed in the back section of said seat.

According to a first approach, the device according to the invention may comprise mechanical means for activating the inflation of said inflatable safety elements, comprising at least one fuse, for example mounted:

on a clip for attaching said car seat to a hook provided for this purpose in a motor vehicle; and/or on a strap for attaching the upper part of the back section, or a corresponding base, to the motor vehicle, or on means rigidly connected to said strap.

According to a further approach, it may comprise electronic means for activating the inflation of said inflatable safety elements, such as at least one deceleration sensor and/or a control signal output by a vehicle wherein said device is fitted.

More generally, the inflation activation signal may be output by any mechanical and/or electronic means that are self-contained (associated with the child care device) and/or output by the vehicle.

According to a further feature of some embodiments, the device comprises means for detecting the presence of a child, only authorising the inflation of the inflatable safety elements in the presence of a child in said child care device.

Indeed, it is generally not desirable for the safety elements to be inflated, even in the event of a significant impact (and thus even if activation means require such inflation, if the device is not occupied). This detection may for example be carried out using a weight sensor placed under the seat section, or a suitably positioned contact.

According to one particular embodiment, said detection means are formed or engage with said means for attaching said inflatable safety elements together, and output information relating to the presence of a child when said attachment means are attached.

In this way, it is easy to determine the child's presence, for example via a closed electrical contact when the chest clip is locked. Moreover, the information is directly available in the vicinity of the inflatable elements.

Further features and advantages of the invention will emerge more clearly on reading the following description of a preferential embodiment of the invention, given merely as an illustrative and non-limitative example, and the appended figures wherein:

FIG. 1 illustrates an example of a car seat according to the invention;

FIGS. 2A and 2B represent the car seat in FIG. 1, the inflatable elements having been deployed;

FIG. 3 represents, flat and non-inflated, the airbag used in the seat in FIGS. 1 and 2;

FIG. 4 shows more specifically a sleeve intended for the seat in FIGS. 1 and 2, before fitting one of the inflatable elements;

FIG. 5 shows the sleeve in FIG. 4, after fitting the inflatable element;

Figure 6:
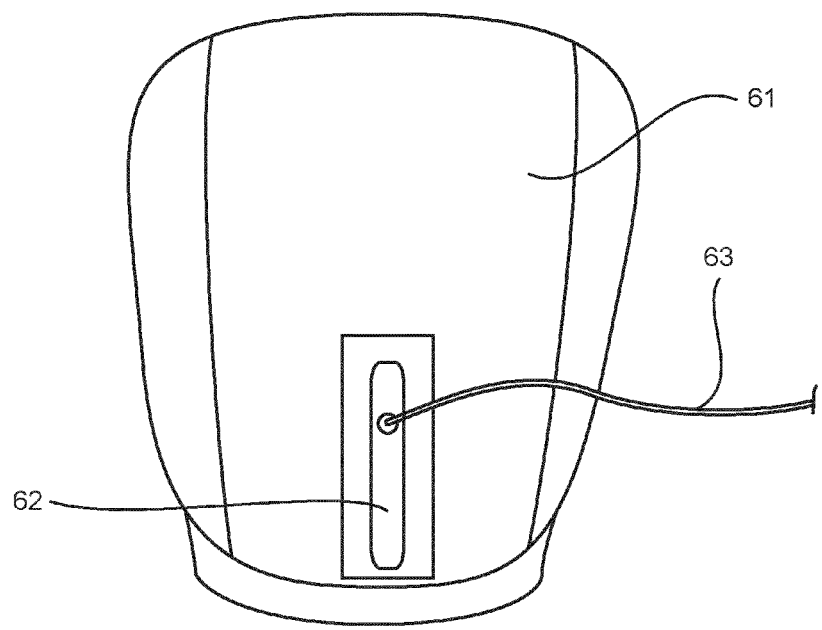
FIG. 6 represents the rear of the car seat in FIGS. 1 and 2, equipped with a cylinder for inflating the inflatable elements.

The invention thus offers a novel approach for airbags to be fitted in child care devices. The embodiment described hereinafter relates to child car seats. However, those skilled in the art would understand that the same approach may be readily adapted to other child care devices, provided they are equipped with a harness.

More specifically, as illustrated in FIGS. 1 and 2, the airbags consist of two inflatable elements, each respectively mounted on one of the straps of the child's harness and, more specifically, in the embodiment described, in the sleeves fitted on the straps.

According to the invention, these two elements are further attached together, by attachment means provided for this purpose, at or in the vicinity of the straps. These attachment means are mounted on the inflatable elements, so that they remain attached, and held against each other when deployed.

As seen in FIG. 1, the child car seat 11 conventionally comprises a seat section 111 and a back section 112, having in this case a headrest 113, which may be movable in respect of height, with respect to the back section 112.

The child is held in this seat 11 using a harness 12, comprising two straps 121 and 122, each to be positioned on one of the child's shoulders, and extending substantially vertically on the child's chest, and a crotch guard 123.

When the harness is positioned, the two straps 121 and 122 and the crotch guard 123 are attached by a locking buckle 124. Each strap 121 and 122 has a sleeve 131, 132, taking position on the child's shoulders and/or upper body, to improve the child's comfort and safety.

These sleeves are generally adjustable in respect of the height thereof, by sliding along the corresponding strap, so as to be suitably positioned at the child's shoulder and chest, according to the child's size.

In the embodiment described, each of these sleeves 131 and 132 contains an inflatable safety element 141, 142 (not shown in FIG. 1). The inflatable safety elements are folded and housed in the sleeves, so as to be deployed effectively, in the event of an impact.

In further embodiments, the inflatable safety elements may be incorporated directly into each strap.

Moreover, these inflatable safety elements 141 and 142 are connected by attachment means 15, attaching them together, when the child is positioned in the seat.

These attachment elements 15 comprise, in the embodiment illustrated, two flexible portions, or strips 151 and 152, each fitted with a respectively male and female buckle element, suitable for insertion into each other to attach the two strips 151 and 152, and suitable for separation from each other, by a suitable manual action (chosen such that the child in the seat cannot detach these attachment means him/herself).

According to this embodiment, the attachment means 15 also hold the two straps 121 and 122 in a sufficiently close position, when a child is sitting in the seat (chest clip function). This ensures that the straps are correctly positioned, and prevents the child from slipping an arm under one of the straps and/or removing one of the straps when the harness is buckled.

It is possible to envisage other types of attachment means, or to envisage a plurality of attachment means, for example sets of strips and buckles, one in the upper position and the other in the lower position of the safety elements, when deployed.

When positioning the child, the harness is thus conventionally positioned by placing the straps 131 and 132 on the child's shoulders (if applicable, the height of these straps and/or the sleeves may be adjusted), and these two straps are then attached to the crotch guard 123, using the buckle 124. The attachment means 15 are then attached. The child is released in reverse order, by detaching the attachment means 15, then detaching the attachment means 121, 122 and the crotch guard 123, via the buckle 124.

In the event of a significant impact, greater than a predetermined threshold, the two inflatable safety elements 141 and 142 are deployed automatically and very rapidly, from the sleeves 131 and 132, particularly to protect the child's head, and limit the forward movement thereof, as illustrated in FIGS. 2A and 2B. As seen in these figures, the two inflatable safety elements 141 and 142 form the equivalent of a single bag, in that they are held in place by the attachment means 15. In this way, although these two elements 141 and 142 are each deployed on either side of the child, they are not separated from each other, and the child's head is not liable to continue moving between the two safety elements 141 and 142.

It should be noted that the shape of these safety elements 141 and 142 is in this case suitable for optimising protection at the face, while also providing satisfactory protection of the head and neck.

According to further embodiments, the inflatable elements may also be devised and positioned to act, at least partly, on the child's chest. Moreover, further inflatable elements may be envisaged, for example in the seat structure and/or in the buckle of the harness.

In any case, it is understood that the assembly of the safety elements on the harness straps, and particularly in the sleeves, the positions whereof are adjustable according to the child's size, ensures correct positioning of the inflatable elements, when deployed, regardless of the child's size.

Attachment, for example via a seam or a tie on each strap of the harness, may be envisaged, to control the direction of deployment of the inflatable elements, and particularly prevent excessive upward deployment.

FIG. 3 represents an embodiment of the inflatable safety elements, shown flat and non-inflated. The two inflatable safety elements 141 and 142 are supplied, via a first end 1421, 1411 by a cylinder of a suitable fluid (not shown) connected to a supply inlet 31.

The two safety elements are continued by an intermediate portion 1412, 1422, to be essentially deployed around the child's neck, and end with two larger end portions 1413 and 1423, deployed in front of the child's head. These two ends 1413 and 1423 are equipped with attachment means 151 and 152.

In the embodiment illustrated, the two safety elements 141 and 142 are parts of the same airbag. According to a further embodiment, two independent inflatable elements may be involved.

These inflatable safety elements 141 and 142 are, in the embodiment illustrated, housed in the sleeves 131 and 132, in a housing as illustrated in FIGS. 4 and 5. FIG. 4 shows an open sleeve, for receiving the inflatable element (not yet fitted). FIG. 5 shows the closed sleeve, i.e. in the usual position of use (in the absence of an impact causing the deployment of the inflatable element), wherein the inflatable element is folded (and not visible) in the housing thereof.

This embodiment is advantageous, since the sleeves are movable along the straps, and always positioned in the upper part of the child's body, at or in the vicinity of the shoulders (moreover, techniques have been proposed, for controlling correct sleeve positioning). In this way, regardless of the child's size, the safety elements are deployed in an optimised manner, at the child's neck and face.

In a further embodiment, the inflatable safety elements may be positioned on the harness and configured substantially lower, at the child's chest. They are then deployed substantially below the child's head. This increases the contact area of the child's body with these inflatable elements, while preventing significant movement of the head, without requiring a very significant inflated volume.

According to further embodiments, however, the safety elements may be housed in the harness, or in a specific part mounted thereon. Preferentially, attachment means are provided, for connecting them together. This connection may be made directly between the inflatable elements, or indirectly, at the straps or sleeves. In the latter case, the inflatable elements may be attached to the straps or to the sleeves, for example by stitching and/or insertion in a housing.

In the embodiment in FIG. 4, a specific housing is provided in the sleeve, for receiving the inflatable safety elements (in a simplified version, the inflatable element may be merely inserted between the sleeve and the strap).

The sleeve thus comprises, conventionally, an area 41 for circulating the strap 121. Furthermore, a housing is defined for the inflatable element 141, consisting in this case of a back end 42 and two flexible flaps 43, 44, folding back onto each other (successively arrows A and B). In a further embodiment, a single flap may be envisaged.

The flap(s) may be attached together and/or with a further portion of the harness using snap fasteners, securing means such as Velcro® 45, 46, a seam, gluing, etc. These various means are chosen so as to be fusible, i.e. they yield when the inflatable elements are inflated, without impeding the deployment thereof.

In this way, when the airbags are deployed, the pressure is sufficient to detach the flaps, and enable the deployment of the two safety elements 141, 142.

The flaps have slots or openings 47, 48, for inserting the attachment means 151 or 152.

A seam of the inflatable element, or another type of attachment, on the harness or the sleeve may be provided, for better control, if required, of the deployment of the inflatable elements in the desired direction.

In particular, each inflatable element is advantageously connected to the sleeve by two seams 49, 410 (which are not fusible, i.e. strong enough not to yield during the deployment of the inflatable element), situated in the upper part (at the child's shoulder) and in the lower part (at the child's chest), respectively. These seams 49, 410 substantially correspond to the positions of the arrows C and D (FIG. 3) on the inflatable element, respectively.

As illustrated in FIG. 6, the means for inflating the safety elements may be housed in the back section 61 of the seat. They comprise a cylinder 62, containing a fluid suitable for the immediate inflation of the two safety elements. This fluid may particularly be a gas such as helium, nitrogen or carbon dioxide.

This cylinder 62 is placed in a housing provided for this purpose. This housing may, depending on the case, by placed in the back section, seat section or base of the car seat, in any suitable position. A tube 63 is connected to the fluid supply inlet 31 (FIG. 3).

Inflation should obviously only be activated in the event of a sufficiently significant impact. A suitable predetermined threshold is thus defined.

Figures 7, 8:
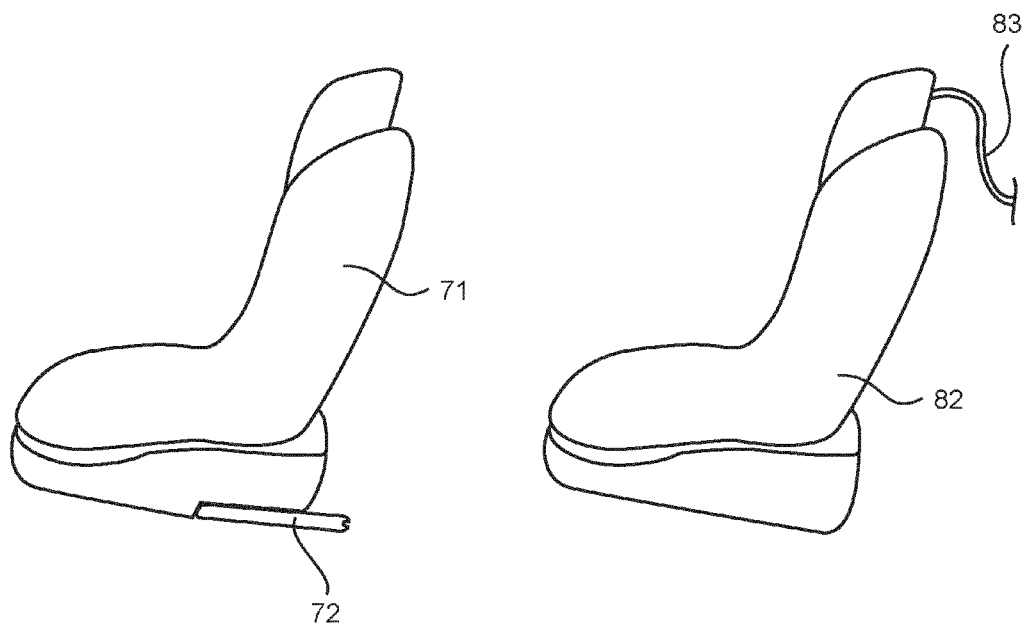
FIG. 7 illustrates a first example of installation of a sensor for activating the inflatable elements, in an Isofix® clip.
FIG. 8 illustrates a second embodiment of an activation sensor, positioned at the upper headrest strap.

A plurality of methods for detecting this threshold may be envisaged. For example, as illustrated in FIG. 7, in the case of a car seat 71 equipped with Isofix® clips 72 for attaching the car seat 71 to rings provided for this purpose in the vehicle seat, this activation may be carried out via a mechanical fuse (not shown), directly connected to or integrated in one and/or the other of the Isofix® clips 72. Indeed, the clip is subjected to movement during an impact or an accident, that can be made use of to control activation.

According to a further approach, illustrated in FIG. 8, in the case of a seat 82, equipped with a strap 83 fitted in the upper part of the back section (or the base of the seat), and to be connected to a coupling element in the vehicle (strap referred to as "top tether"), activation may be carried using a fuse connected directly to this strap 83, or to means for coupling therewith, on the back section or the base. Once again, it is thus possible to make use of the movement of the upper portion of the seat, following an impact or an accident.

Moreover, it is generally not desirable for the safety elements to be inflated, even in the event of a significant impact (and thus even if activation means require such inflation), if the seat is not occupied by a child.

Various means for detecting presence are already known. In this way, this detection may for example be carried out using a weight sensor positioned under the seat section, or a suitably positioned contact, for example in the back section or seat section.

According to one particular approach, these detection means consist of or engage with the strips 151 and 152, and output information relating to the presence of a child when said attachment means are attached.

In this way, it is easy to determine the child's presence, for example via a closed electrical contact when the chest clip is locked. The information is directly available in the vicinity of the inflatable elements, and may be combined, for example via a logical AND in the activation means, with a signal output by a fuse detecting an impact greater than the predetermined threshold.

In the embodiment described above, the car seat is fitted with a "5 point" type harness. Obviously, the invention may be applied to other types of harness, provided that two straps thereof can receive two inflatable safety elements. Moreover, the invention is not only applicable to car seats, but may also be used in other child care devices, such as pushchairs, carry cots, etc.

The invention claimed is:

1. Child care device suitable for receiving a child, comprising a harness having two straps configured to extend from the shoulders along a child's chest,
   wherein each of the straps is equipped with an inflatable safety element, suitable for being inflated in the event of an impact above a predetermined threshold,
   characterized in that the child care device further comprises
   attachment means for reversibly attaching said inflatable safety elements together.

2. Child care device according to claim 1, characterized in that said attachment means comprise at least two flexible portions attached by a first of the ends thereof to either of said inflatable elements, respectively, and having at the second ends thereof additional coupling means, configured so as to extend transversally between the straps, when they are attached.

3. Child care device according to claim 2, characterized in that said flexible portions, when the coupling means thereof are attached, also hold the straps together.

4. Child care device according to claim 1, characterized in that said straps each have a sleeve, that is slidable along the strap, and in that said inflatable safety elements are housed in said sleeves.

5. Child care device according to claim 4, characterized in that said sleeves have at least one movable flap configured to cooperate with another portion of said sleeve to form a housing for one of said inflatable safety elements.

6. Child care device according to claim 4, characterized in that each of said inflatable safety elements is attached to one of said sleeves via two connections, in the vicinity of each of the ends of said sleeve, respectively.

7. Child care device according to claim 4, characterized in that said inflatable safety elements are attached to said sleeves by stitching.

8. Child care device according to claim 4, characterized in that each of said sleeves has a side opening for inserting said attachment means.

9. Child care device according to claim 1, characterized in that said inflatable safety elements are configured so as to define, when inflated, lateral protection on the child's neck and the equivalent of a central bag at the child's head, by the end portions thereof connected together by the attachment means.

10. Child care device according to claim 1, characterized in that said inflatable safety elements are supplied with at least one source of fluid.

11. Child care device according to claim 10, characterized in that said at least one source of fluid is housed in a back section of said seat.

12. Child care device according to claim 1, characterized in that the child care device further comprises mechanical means for activating the inflation of said inflatable safety elements, comprising at least one fuse mounted
   on at least one of a clip for attaching a car seat to a hook provided for this purpose in a motor vehicle; and on a strap for attaching the upper part of the back section, or a corresponding base, to the motor vehicle, or on means rigidly connected to said strap.

13. Child care device according to claim 1, characterized in that the child care device further comprises electronic means for activating the inflation of said inflatable safety elements, such as at least one of a deceleration sensor and a control signal output by a vehicle wherein said device is fitted.

14. Child care device according to claim 1, characterized in that the child care device further comprises detection means for detecting the presence of a child, only authorising the inflation of the inflatable safety elements in the presence of a child in said child care device.

15. Child care device according to claim 14, characterized in that said detection means mates with said attachment means for attaching said inflatable safety elements together, and output information relating to the presence of a child when said coupling means are attached.

16. A child care device suitable for receiving a child comprising
   a child-restraint harness including a first shoulder strap and a second shoulder strap arranged to lie alongside and in spaced-apart relation to the first shoulder strap to provide a neck-receiving space therebetween through which the neck of a child extends when the child-restraint harness is worn by the child and
   an inflatable head-cushion system coupled to the harness and configured to inflate in response to a signal provided by an impact detector to cushion a head of a child wearing the child-restraint harness, the inflatable head-cushion system including a first element-storage sleeve coupled to the first strap, a second element-storage sleeve coupled to the second strap to locate the neck-receiving space between the first and second element-storage sleeves, and an inflatable unit including a first inflatable element stored temporarily in a storage chamber formed in the first element-storage sleeve, a second inflatable element stored temporarily in a storage chamber formed in the second element-storage sleeve, and a fluid supply system coupled in fluid communication to each of the first and second inflatable elements and configured to conduct a pressurized fluid into each of the first and second inflatable elements to inflate the first and second inflatable elements substantially simultaneously to change shape from a compact storage shape to a relatively larger expanded use shape so as to cause each of the first and second inflatable elements to deploy and exit a storage chamber formed in the companion element-storage sleeve and cooperate to provide means for cushioning the head of a child wearing the child-restraint harness.

17. The child care device of claim 16, wherein the inflatable head-cushion system further includes an attachment element arranged to extend across the neck-receiving space and coupled to portions of each of the first and second inflatable elements housed normally in the storage chambers of the first and second element-storage sleeves to provide means for holding the first and second inflatable elements against each other in the neck-receiving space in front of the head of a child wearing the child-restraint harness after inflation of each of the first and second inflatable elements to assume the expanded use shape so that slippage of the head through a space provided between the first and second inflatable elements is blocked.

18. The child care device of claim 17, wherein each of the first and second element-storage sleeves is formed to include a strap-receiving opening and the attachment element comprises a strap including a first segment arranged to extend through the strap-receiving opening formed in the first element-storage sleeve to mate with the first inflatable element and a second segment arranged to extend through the strap-receiving opening formed in the second element-storage sleeve to mate with the second inflatable element.

19. The child care device of claim 18, wherein the attachment element further comprises a buckle unit for releasably coupling the first segment to the second segment so that the first and second segments can be joined together when the child-restraint harness is worn by the child and the first and second segments can be separated from one another to separate the first and second shoulder straps from one another to facilitate removal of the child-restraint harness from the child.

20. The child care device of claim 18, wherein the first element-storage sleeve includes a back coupled to the first shoulder strap and a foldable flap coupled to the back along a fold line and arranged to lie in confronting relation to the back normally to form the storage chamber therebetween.

21. The child care device of claim 20, wherein the strap-receiving opening of the first element-storage sleeve is formed in the foldable flap along the fold line.

22. The child care device of claim 16, wherein the first inflatable element includes a free end coupled to the first element-storage sleeve and an opposite fluid-receiving end separated from the first element-storage sleeve and arranged to lie behind the head of a child wearing the child-restraint harness and the second inflatable element includes a free end coupled to the second element-storage sleeve and an opposite fluid-receiving end separated from the second element-storage sleeve and arranged to mate in fluid communication with the fluid-receiving end of the first inflatable element to cause pressurized fluid discharged by the fluid supply system to be admitted into each of the first and second inflatable elements to inflate the first and second inflatable elements substantially simultaneously.

23. The child care device of claim 22, wherein the inflatable head-cushion system further includes an attachment element arranged to extend across the neck-receiving space and coupled to the free ends of each of the first and second inflatable elements housed normally in the storage chambers of the first and second element-storage sleeves to provide means for holding the first and second inflatable elements against each other in the neck-receiving space in front of the head of a child wearing the child-restraint harness after inflation of each of the first and second inflatable elements to assume the expanded use shape so that slippage of the head through a space provided between the first and second inflatable elements is blocked.

24. The child care device of claim 23, wherein each of the first and second element-storage sleeves is formed to include a strap-receiving opening and the attachment element comprises a strap including a first segment arranged to extend through the strap-receiving opening formed in the first element-storage sleeve to mate with the first inflatable element and a second segment arranged to extend through the strap-receiving opening formed in the second element-storage sleeve to mate with the second inflatable element.

25. A child care device suitable for receiving a child comprising
a child-restraint harness including a first shoulder strap and a second shoulder strap arranged to lie alongside and in spaced-apart relation to the first shoulder strap to provide a neck-receiving space therebetween through which the neck of a child extends when the child-restraint harness is worn by the child and
an inflatable head-cushion system coupled to the harness and configured to inflate in response to a signal provided by an impact detector to cushion a head of a child wearing the child-restraint harness, the inflatable head-cushion system including a first sleeve coupled to the first strap, a second sleeve coupled to the second strap to locate the neck-receiving space between the first and second sleeves, and an inflatable unit including a first inflatable element stored in a first space associated with the first sleeve, a second inflatable element stored in a second space associated with the second sleeve, and a fluid supply system coupled in fluid communication to each of the first and second inflatable elements and configured to conduct a pressurized fluid into each of the first and second inflatable elements to inflate the first and second inflatable elements substantially simultaneously to change shape from a compact storage shape to a relatively larger expanded use shape so as to cause each of the first and second inflatable elements to deploy and cooperate to provide means for cushioning the head of a child wearing the child-restraint harness.

26. The child care device of claim 25, wherein the inflatable head-cushion system further includes an attachment element arranged to extend across the neck-receiving space and coupled to portions of each of the first and second inflatable elements to provide means for holding the first and second inflatable elements against each other in the neck-receiving space in front of the head of a child wearing the child-restraint harness after inflation of each of the first and second inflatable elements to assume the expanded use shape so that slippage of the head through a space provided between the first and second inflatable elements is blocked.

* * * * *